Sept. 11, 1928.　　　　D. C. JOHNSON　　　　1,684,226
WHEEL PULLER
Filed Feb. 2, 1928
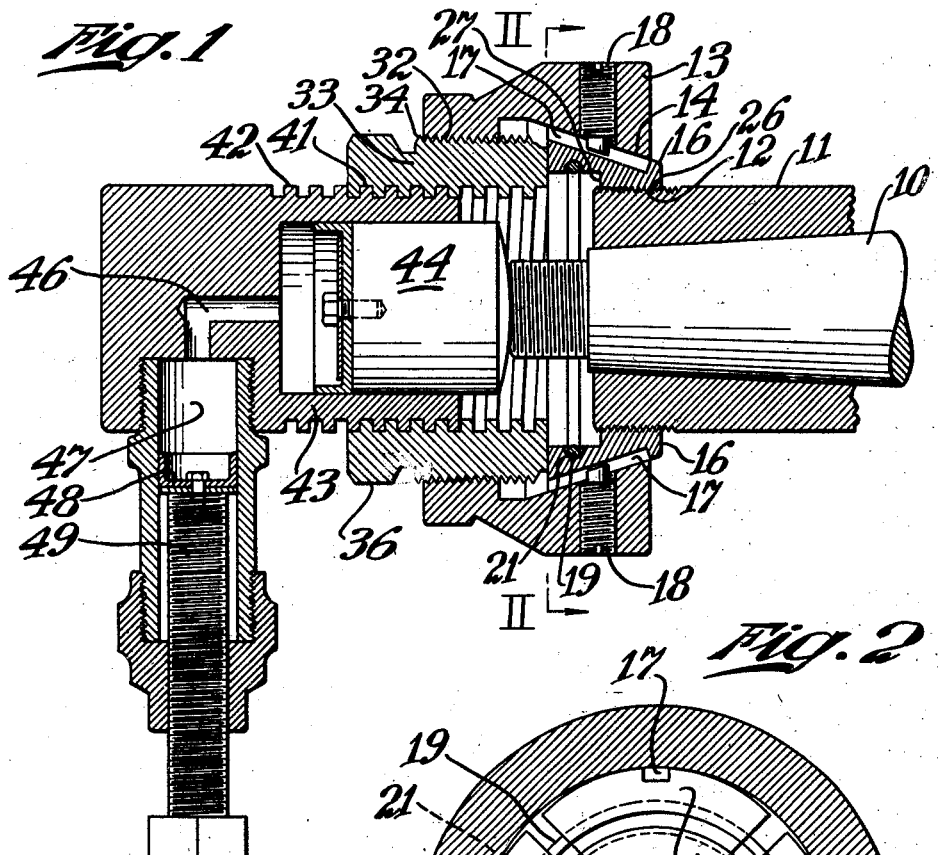
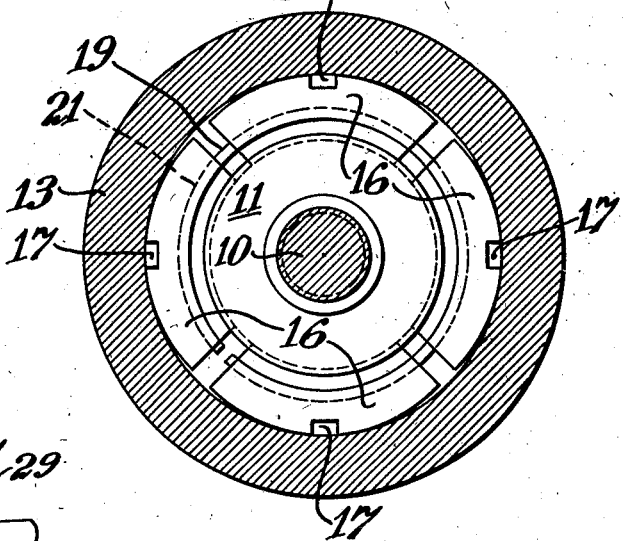
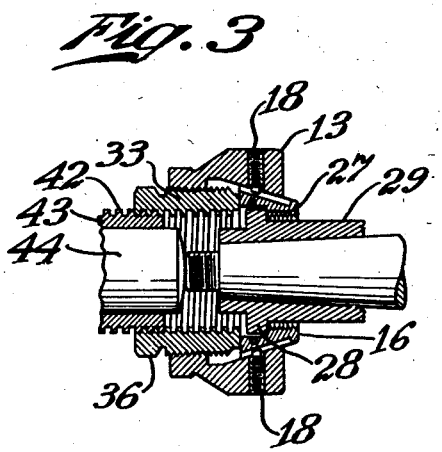
Inventor
D. C. Johnson
By Johnston & Jennings
Attorney Patented Sept. 11, 1928.

1,684,226

UNITED STATES PATENT OFFICE.

DAVID CLEVELAND JOHNSON, OF CARBON HILL, ALABAMA.

WHEEL PULLER.

Application filed February 2, 1928. Serial No. 251,438.

My invention relates to wheel pullers, particularly for use with automobile wheels, and has for its object the provision of a device of the character designated which shall be adapted, without change, to be used with wheels having hubs of different diameters.

A further object of my invention is to provide a wheel puller embodying a pulling member adapted to engage with hubs having threaded ends and also hubs having a collar or lugs thereon.

A more specific object of my invention is to provide a wheel puller embodying segmental pulling members adapted to engage threaded wheel hubs of different diameters or to engage with a puller engaging collar or projection on the hub, together with means effective to maintain the segmental pulling members in their proper relation to the rest of the device.

Briefly, my invention comprises an outer sleeve having its inner diameter bored to form the frustum of a cone, segmental hub engaging members fitting within the sleeve and held in predetermined angular relation thereto, an inner sleeve member screwed into the outer sleeve member and bearing against the ends of the segmental hub engaging members to cause them to close in upon the wheel hub, and means engaging the axle and cooperating with the inner sleeve member to exert a pulling effort on the hub.

A device embodying features of my invention is illustrated in the accompanying drawing forming a part of this application, wherein Fig. 1 is a longitudinal sectional view through the device and showing it in engaged relation with a threaded wheel hub;
Fig. 2 is a transverse sectional view taken along the line II—II of Fig. 1, and Fig. 3 is a view similar to Fig. 1 and showing my improved wheel puller engaged with a wheel hub having puller engaging projections thereon.

Referring now to the drawing for a better understanding of my invention, I show an axle 10 having a wheel hub 11 mounted thereon. The outer end of the hub is threaded at 12 in order to afford means for engaging a wheel pulling device. My improved wheel pulling device comprises an outer sleeve member 13 having its inner surface bored to form the frustum of a cone 14. Fitting into the sleeve 13 are four segmental hub engaging members 16, each provided with a longitudinal groove 17 adapted to receive a screw 18 extending through the sleeve 13 and which prevents relative turning movement between the sleeve and the segmental members. The segmental members are held outwardly against the sleeve by means of a spring 19 fitting in a groove 21 formed around the inner sides of the segmental members. The segmental members 16 are bored to provide a threaded hub engaging surface 26 adapted to engage with the threaded end portion 12 of the hub 11, as shown in Fig. 1, and a larger diameter portion to provide a hub engaging jaw 27 adapted to engage a ring 28 provided on a hub 29 such as is shown in Fig. 3.

In making the segmental members 16, I turn and bore them from a solid piece and form the grooves 17 therein, then cut them to form the four segments as shown in Fig. 2. When spread apart, as shown in Fig. 2, the outer surfaces of the segments have their center portions engaging with the frustoconical inner surface of the sleeve 13 and their ends slightly away from the inner surface, due to the inner surface of the cone being bored with a different radius than the turning radius for the outer surfaces of the segments. As the segments are brought closer together by relative longitudinal movement between them and the sleeve to clamp them about a wheel hub, the outer surfaces of the segments present a greater bearing surface to the sleeve. Inasmuch as the number of threads per inch on all wheel hubs, with which I am familiar, is the same, the internally threaded segments 16 are adapted to fit on the different sized threaded hubs of automobile wheels without damage to the threads.

The other end of the sleeve member 13 is bored cylindrically, and internally threaded at 32 to receive an inner sleeve member 33 having similar threads 34 and having a hexagonally, or otherwise suitably shaped head 36 to receive a tool to screw the sleeve 33 into the sleeve 13. In applying the device to a wheel hub, the inner sleeve 33 is retracted to allow the segments to be moved inwardly causing them to spread enough to pass easily over the wheel hub. The inner sleeve member 33 is then screwed into the outer sleeve member 13 to force the segments 16 outwardly, whereupon the frusto-conical bore of the sleeve 13 causes the segments 16 to be moved inwardly and down over the threads 12 of the hub 11, as seen in Fig. 1, or until the jaw 27 engages the projection 28 of the hub 29, as seen in Fig. 3. In this position, the device is in position to pull the wheel.

While different means might be employed to exert the pulling effect on the wheel hub, I prefer to employ a hydraulic means such as is disclosed in my application, Serial No. 193,036, filed May 20, 1927 now Patent No. 1,668,565, dated May 8, 1928. To this end, I provide the inner sleeve 33 with internal threads 41 for receiving the exteriorly threaded portion 42 of a hydraulic jack cylinder 43. Fitting within the cylinder 43 is a piston 44 adapted to bear against the end of the axle 10. A passage 46 extends outwardly from the end of the cylinder 43 and communicates with a plunger cylinder 47 screwed into the cylinder 43. Fitting within the plunger cylinder 47 is a plunger 48 in threaded engagement with a cover 49 screwed on the outer end of the cylinder 47. With the parts in the position shown in Fig. 2 and the cylinders 47 and 43 filled with grease or any suitable liquid, the plunger 48 is screwed inwardly of the cylinder 47 and the pressure so developed is exerted against the piston 44 which, in turn, presses against the end of the axle 10 and pulls the hub 11 from the axle.

From the foregoing it will be apparent that I have devised an improved wheel puller, adapted for use with wheel hubs of various sizes and configurations and which is simple of construction and reliable of operation.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are imposed by the prior art or as are specifically set forth in the appended claims.

What I claim is:

1. A wheel puller comprising an outer sleeve member having its inner surface bored to form a frustum of a cone, a plurality of internally threaded segmental hub engaging members fitting within the outer sleeve, an inner sleeve member screwed into the outer sleeve member and bearing against the segmental members, said inner sleeve member being internally threaded, and means screwed into the inner sleeve member and bearing against the wheel axle to exert a pulling force on the hub.

2. In a wheel puller, an outer sleeve member having a portion of its inner surface bored to form the frustum of a cone, segmental hub engaging members fitting into the frusto-conical portion of the outer sleeve member, an inner sleeve member screwed into the outer sleeve member and bearing against the ends of the segmental hub engaging members to cause them to engage the hub, and means cooperating with the inner sleeve member to exert a pulling effort on the segmental members.

3. In a wheel puller, an outer sleeve member having one end of its inner side bored to form the frustum of a cone diminishing in diameter toward the end of the member, segmental hub engaging members fitting into the frusto-conical portion of the outer sleeve member, resilient means for holding the segmental members in engagement with the outer sleeve member, the other end of the outer sleeve member being internally threaded, an inner sleeve member screwed into the other end of the outer sleeve member and bearing against the ends of the segmental hub engaging members, said inner sleeve member being provided with means whereby it may be advanced and retracted in the outer sleeve member to cause the hub engaging members to open or close about a hub, and means cooperating with the inner sleeve member to exert a pulling effort on the hub engaging members.

4. In a wheel puller, an outer sleeve member having one end of its inner surface bored to form the frustum of a cone diminishing in diameter toward the end of the member, segmental hub engaging members fitting into the frusto-conical portion of the outer sleeve member, resilient means for holding the segmental members in engagement with the outer sleeve member, the other end of the outer sleeve member being internally threaded, an inner sleeve member screwed into the other end of the outer sleeve member and bearing against the ends of the segmental hub engaging members, said inner sleeve member being provided with means whereby it may be advanced and retracted in the outer sleeve member to cause the hub engaging members to open or close about a hub, and hydraulic means cooperating with the inner sleeve member to exert a pulling effort on the hub engaging members.

5. A device as set forth in claim 4 wherein means are provided to prevent relative rotation between the outer sleeve member and the hub engaging members.

6. In a wheel puller, an outer sleeve member having one end internally bored to form a frustum of a cone diminishing in diameter toward the outer end of the sleeve and having the other end internally threaded, a plurality of segmental hub engaging members fitting in the frusto-conical sleeve, a portion of the internal surface of the segmental members being threaded and a portion being bored to form a pulling jaw, resilient means for holding the segmental members outwardly against the outer sleeve member, an inner sleeve member screwed into the outer sleeve member and bearing against the inner ends of the segmental members and adapted to close the segmental members about the wheel hub, said inner sleeve being internally threaded, and axle engaging means screwed into the inner sleeve.

7. A device as set forth in claim 6 in which the segmental members are provided with exterior longitudinal grooves and the outer sleeve member is provided with a plurality of radially extending screws fitting in the grooves to prevent relative angular movement between the segmental members and the outer sleeve members.

In testimony whereof I, DAVID CLEVELAND JOHNSON, affix my signature.

DAVID CLEVELAND JOHNSON.